Figure 1:
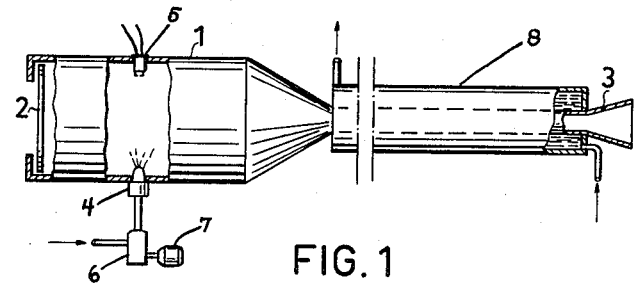

March 2, 1965  J. A. RYDBERG  3,171,465

FURNACE FOR INTERMITTENT COMBUSTION

Filed Sept. 20, 1961

INVENTOR.
John Anders Rydberg
BY
Pierce, Scheffler & Parker
attys

# United States Patent Office 3,171,465
Patented Mar. 2, 1965

3,171,465
FURNACE FOR INTERMITTENT COMBUSTION
John Anders Rydberg, Stockholm, Sweden, assignor to Aktiebolaget Gustavsbergs Fabriker, Gustavsberg, Sweden, a corporation of Sweden
Filed Sept. 20, 1961, Ser. No. 139,497
Claims priority, application Sweden, Sept. 22, 1960, 9,034
1 Claim. (Cl. 158—4)

This invention relates to a furnace for intermittent combustion, comprising one or more outlet ducts and an air intake controlled by a non-return valve and operating at a frequency of less than 50 cycles per second. Irrespective of the natural frequency of the furnace the intended frequency may be established by the use of a positively controlled fuel supply device which admits fuel intermittently at the desired frequency. After each explosion in the furnace the products of combustion are forced out through the outlet at a high velocity, and due to the inertia of the outlet gases a negative pressure is established in the furnace, resulting in that the inlet valve is opened and fresh air is drawn in. For the ignition of the fuel after each fuel injection there may be used an electric spark plug at least when the furnace is started, whereas during normal operation of the fuel-air mixture can be ignited by means of incandescent members which are provided in the furnace and are maintained incandescent by the products of combustion.

In order to obtain a great capacity of the furnace, it is important that a great amount of air be drawn into the furnace after each explosion. A condition therefor has proved to be that the velocity of the exhaust gases during their passage through the outlet ducts be high at the moment when the pressure becomes negative in the furnace and the suction of air begins. It also has proved that the velocity of the gases is a function of the ratio of the volume of the furnace to the total volume of the outlet ducts.

If for a given volume of the furnace the volume of the gases in the outlet ducts exceeds a certain value, the superatmospheric pressure in the furnace is not able to accelerate the exhaust gases up to a high velocity. If, on the other hand, the volume of the gases in the ducts is small, the velocity of the gases in the ducts has time to culminate and decrease to a comparatively low value prior to the supply of air.

The furnace according to the invention is substantially characterized in that the ratio of the volume of the furnace to the total volume of the outlet ducts is between 0.1:1 and 1:1 and that the supply of fuel and the progress of combustion are controlled such as at each explosion to establish a superatmospheric pressure in the furnace of between 0.5 and 2.0 kgs. per square centimeter. The higher value of the pressure applies to a low value of the volume ratio and vice versa, resulting in that the highest gas velocity in the outlet ducts will be obtained at the right moment, causing a large amount of air to be drawn into the furnace. The large amount of air renders possible combustion of great amounts of fuel and increases the capacity of the furnace.

The furnace according to the invention is preferably intended to be used in connection with a steam boiler or heating boiler, in which case the walls of the outlet ducts constitute the major part of the heating surface. This heating surface must be of a certain size such that the products of combustion during their passage through the duct or ducts are cooled to an economically and technically suitable final temperature of for instance 200° C. If in constructing a furnace according to the invention a certain volume of the furnace and a certain value of the ratio of the volume of the furnace to the volume of the duct or ducts are assumed, the condition for the final temperature in consideration determines a certain ratio of the cross-sectional area to the length of the duct or ducts.

Figure 2:
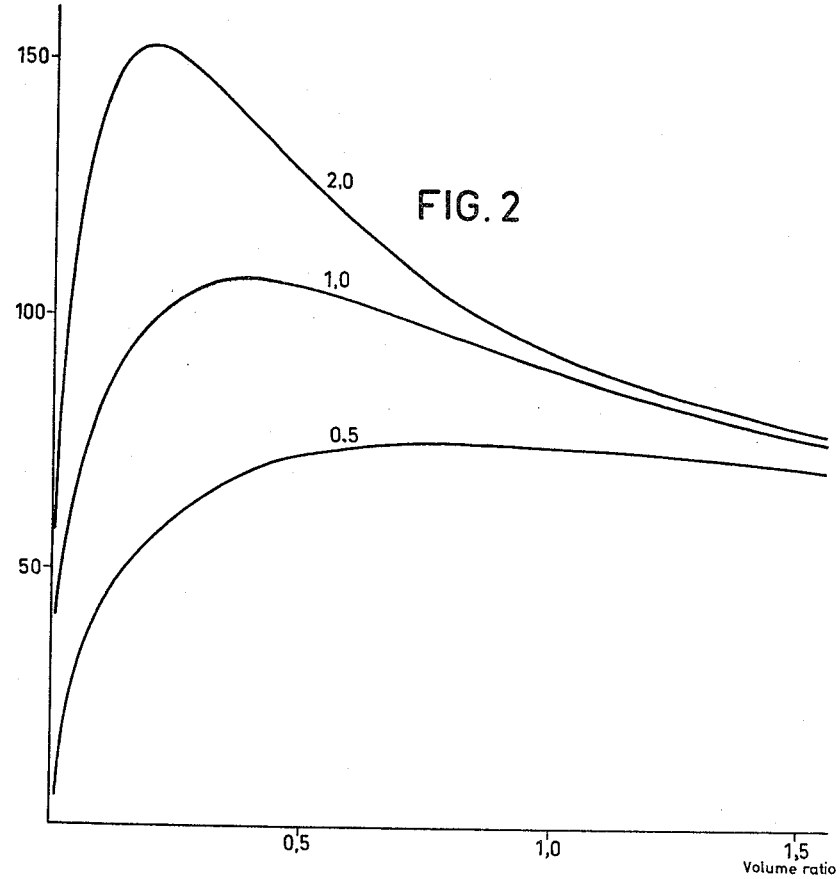

Referring to the accompanying drawing, FIG. 1 is a very diagrammatic section of a furnace of the type in consideration, and FIG. 2 is a diagram which represents the gas velocity in the outlet duct at the moment when the pressure in the furnace has been reduced to atmospheric pressure and air begins to be drawn in as a function of the ratio of the volume of the furnace to the volume of the duct for three different values of the pressure of combustion.

In FIG. 1, numeral 1 denotes the furnace proper which has an air intake controlled by a non-return valve 2. The furnace 1 is in open communication with an outlet duct 3. There are provided one or more fuel nozzles 4 and an electric ignition device 5. Fuel is intermittently supplied to the nozzles 4 by means of a pump 6 of the diesel type driven by the motor 7, the frequency of the fuel supply being determined by the desired frequency of combustion which in the present case is less than 50 cycles per second and may amount, by way of example, to 10 cycles per second. A water jacket 8 having an inlet and an outlet for cooling water as indicated by the arrows serves to cool the outlet duct 3.

From the diagram according to FIG. 2 it will be seen that at a combustion pressure of 2.0 kgs. per square centimeter the highest gas velocity is obtained if the ratio of the volume of the furnace to the volume of the outlet duct equals 0.2:1. At a combustion pressure of 1.0 kg. per square centimeter the maximum is obtained at a volume ratio of about 0.4:1. At a combustion pressure of 0.5 kg. per square centimeter the volume ratio should be about 1:1 to obtain the maximum gas velocity.

From the curves shown in FIG. 2 it appears that in order to obtain the highest possible gas velocity at the right moment, that is, when air begins to be drawn into the furnace, a higher accuracy of the volume ratio is required at a high combustion pressure than at a low combustion pressure.

Although the briefly described and diagrammatically illustrated furnace is assumed to be operated with a liquid fuel, the invention may equally well be applied to the use of a gaseous or pulverized fuel, in which case suitable means are to be provided for the intermittent supply of the fuel.

What I claim is:

A furnace for intermittent combustion, comprising a furnace chamber having at least one outlet duct at one end thereof and an air intake at the other end thereof, a non-return valve controlling said air intake, means for injecting fuel into said furnace chamber, said means operating intermittently at a frequency of less than 50 cycles per second, the ratio of the furnace chamber volume to the duct volume being between 0.1:1 and 1:1 and the fuel injecting means being adjusted to inject during each cycle a fuel quantity sufficient at each explosion to establish a superatmospheric pressure in the furnace chamber of between 0.5 and 2.0 kgs. per square centimeter, higher pressure values corresponding to lower volume ratios.

References Cited by the Examiner

UNITED STATES PATENTS

| | | | |
|---|---|---|---|
| 2,708,926 | 5/55 | Huber et al. | 158—4 |
| 2,715,390 | 8/55 | Tenney et al. | 122—24 |
| 2,748,753 | 6/56 | Sarrazin et al. | 122—24 |
| 2,795,105 | 6/57 | Porter | 158—4 |
| 2,860,484 | 11/58 | Schmidt | 158—4 |
| 2,907,382 | 10/59 | McIlvaine | 158—4 |
| 3,091,224 | 5/63 | Ryberg | 158—4 |

FOREIGN PATENTS 1,165,975   6/58   France.

JAMES W. WESTHAVER, *Primary Examiner.*

FREDERICK L. MATTESON, Jr., PERCY L. PATRICK, ROBERT A. O'LEARY, *Examiners.*